United States Patent
Battré et al.

(10) Patent No.: US 9,501,460 B1
(45) Date of Patent: Nov. 22, 2016

(54) DETECTING AND PROCESSING INVISIBLE ELEMENTS WITHIN A WEB PAGE

(71) Applicant: Google Inc., Mountain View, CA (US)

(72) Inventors: Dominic Pascal Battré, Munich (DE); Andrew Swerdlow, San Francisco, CA (US); Markus Heintz, Munich (DE); Patrick Louis Maurice Nepper, Rosenheim (DE)

(73) Assignee: Google Inc., Mountain View, CA (US)

( * ) Notice: Subject to any disclaimer, the term of this patent is extended or adjusted under 35 U.S.C. 154(b) by 292 days.

(21) Appl. No.: 13/781,621

(22) Filed: Feb. 28, 2013

(51) Int. Cl.
*G06F 3/14* (2006.01)
*G06F 17/24* (2006.01)

(52) U.S. Cl.
CPC ..................................... *G06F 17/24* (2013.01)

(58) Field of Classification Search
CPC ............... G06F 21/566; G06F 21/554; G06F 2221/2119
See application file for complete search history.

(56) References Cited

U.S. PATENT DOCUMENTS

| | | | | |
|---|---|---|---|---|
| 6,643,652 B2 * | 11/2003 | Helgeson | .......... | G06F 17/30569 |
| 6,738,759 B1 * | 5/2004 | Wheeler | .......... | G06F 17/30607 |
| | | | | 707/741 |
| 7,680,851 B2 * | 3/2010 | Liu | .................. | G06F 17/30864 |
| | | | | 707/706 |
| 8,265,778 B2 * | 9/2012 | Taylor | .............. | G06F 17/30958 |
| | | | | 700/43 |
| 8,413,236 B1 * | 4/2013 | Hansen | .................. | G06F 21/50 |
| | | | | 726/22 |
| 8,639,680 B1 * | 1/2014 | Ciccolo | ............. | G06F 17/30867 |
| | | | | 707/705 |
| 8,914,881 B2 * | 12/2014 | Lekies | .................... | G06F 21/51 |
| | | | | 380/28 |
| 2008/0120533 A1 * | 5/2008 | Lazier | ............... | G06F 17/30899 |
| | | | | 715/234 |
| 2008/0281794 A1 * | 11/2008 | Mathur | ............... | G06F 17/3089 |
| 2010/0251371 A1 * | 9/2010 | Brown | .................. | G06F 21/554 |
| | | | | 726/23 |
| 2012/0304286 A1 * | 11/2012 | Croll | .................... | G06F 21/6263 |
| | | | | 726/22 |
| 2013/0091415 A1 * | 4/2013 | Stilling | ................. | G06F 17/211 |
| | | | | 715/234 |
| 2013/0124968 A1 * | 5/2013 | Dontcheva | ............ | G06F 17/212 |
| | | | | 715/234 |
| 2014/0283067 A1 * | 9/2014 | Call | .................... | H04L 63/1425 |
| | | | | 726/23 |

OTHER PUBLICATIONS

Coding Friends, Mar. 10, 2010, pp. 1-3 http://www.codingfriends.com/index.php/2010/03/03/hover-over-to-show-a-hidden-element/.*

* cited by examiner

*Primary Examiner* — Scott Baderman
*Assistant Examiner* — Mario M Velez-Lopez
(74) *Attorney, Agent, or Firm* — McDermott Will & Emery LLP

(57) ABSTRACT

A system and machine-implemented method for detecting and processing invisible elements within a web page. A web page is accessed to detect one or more elements in the web page. One or more criteria for identifying web page elements, which are invisible when displayed, are obtained. The one or more criteria are applied to the one or more elements. Based on the applied criteria, a determination is made that one of the one or more elements is invisible. A notification of the invisible element is provided for display.

18 Claims, 6 Drawing Sheets

DETECTING AND PROCESSING INVISIBLE ELEMENTS WITHIN A WEB PAGE

BACKGROUND

The present disclosure generally relates to web pages and, in particular, to detecting and processing invisible elements within a web page.

Some users who access a website do not necessarily understand that there are subcomponents of that site that are served by third parties. These third parties may load elements on users' web browsers, and can load java script, set cookies, and receive information from the users.

SUMMARY

The disclosed subject matter relates to a machine-implemented method for detecting and processing invisible elements within a web page. The method comprises accessing a web page to detect one or more elements in the web page, and obtaining one or more criteria for identifying web page elements which are invisible when displayed. The method further comprises applying the one or more criteria to the one or more elements, determining, based on the applied criteria, that one of the one or more elements is invisible, and providing a notification of the invisible element for display.

The disclosed subject matter further relates to a system for detecting and processing invisible elements within a web page. The system comprises one or more processors, and a machine-readable medium comprising instructions stored therein, which when executed by the processors, cause the processors to perform operations comprising accessing a web page to detect one or more elements in the web page, and obtaining one or more criteria for identifying web page elements which are invisible when displayed. The operations further comprise applying the one or more criteria to the one or more elements, determining, based on the applied criteria, that one of the one or more elements is invisible, and blocking content associated with the invisible element.

The disclosed subject matter also relates to a machine-readable medium comprising instructions stored therein, which when executed by a system, cause the system to perform operations comprising accessing a web page to detect one or more elements in the web page, and obtaining one or more criteria for identifying web page elements which are invisible when displayed. The operations further comprise applying the one or more criteria to the one or more elements, determining, based on the applied criteria, that one of the one or more elements is invisible, and rendering the invisible element to be visible within the web page.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

Features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

As noted above, some users who access a website do not necessarily understand that there are subcomponents of that site that are served by third parties. These third parties may load elements (e.g., iframes) on users' web browsers, and can load java script, set cookies, and receive information from the users (e.g., HTTP headers). In some cases, the third-party elements can be used for tracking a user (e.g., across different websites). Thus, it may be desirable to notify a user of web page elements from a third party.

The subject disclosure provides for detecting and processing invisible elements (e.g., "third-party elements," or elements served by a third-party domain) within a web page. A web page is accessed to detect one or more elements in the web page. One or more criteria for identifying web page elements, which are invisible when displayed, are obtained (e.g., from a list of criteria). The one or more criteria are applied to the one or more elements. Based on the applied criteria, a determination is made that one of the one or more elements is invisible. A notification of the invisible element is provided for display.

Figure 1:
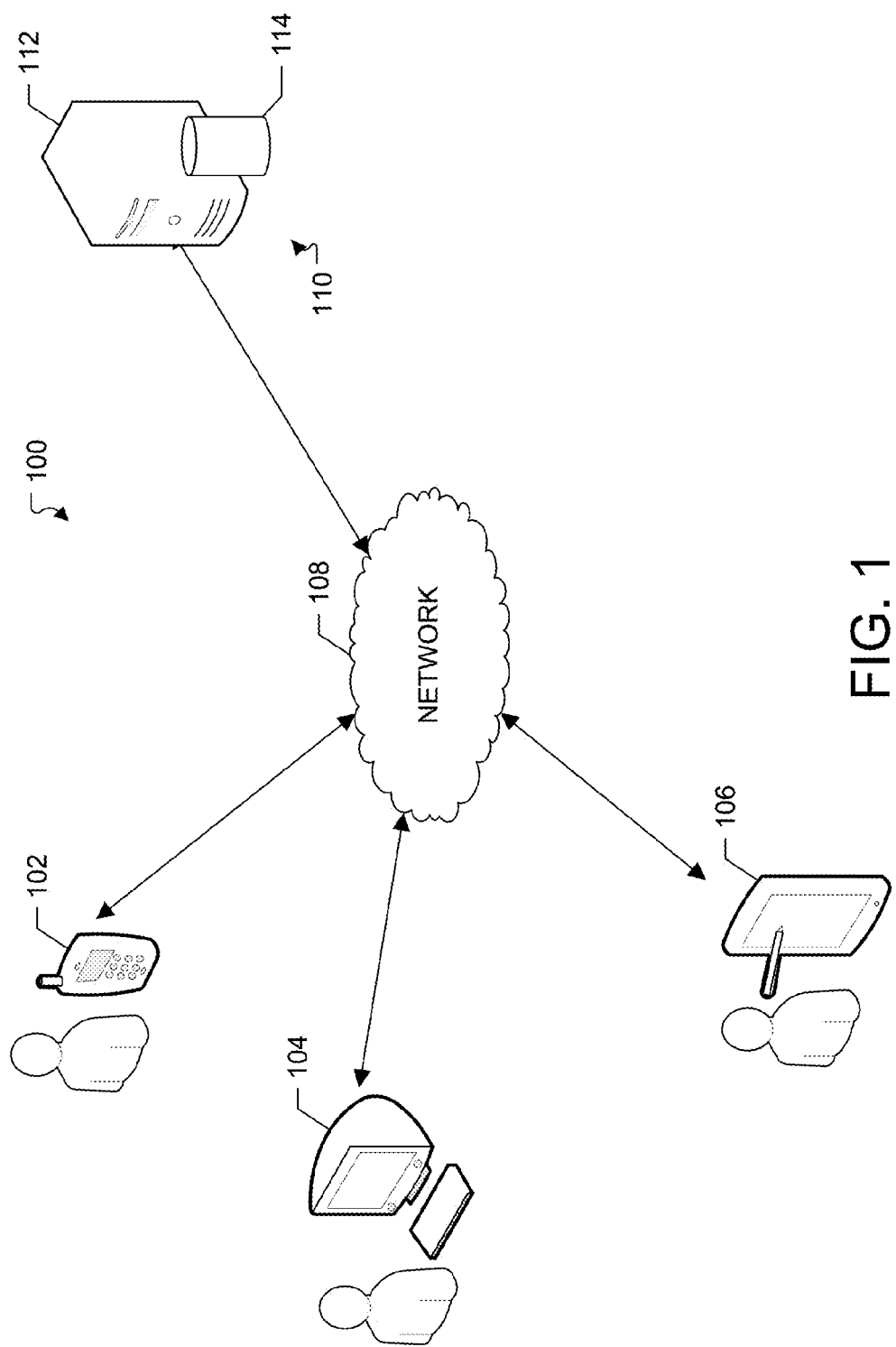
FIG. 1 illustrates an example network environment which can provide for detecting and processing invisible elements within a web page.

FIG. 1 illustrates an example network environment which can provide for detecting and processing invisible elements within a web page. A network environment 100 includes computing devices 102, 104 and 106 and computing system 110. Computing devices 102-106 and computing system 110 can communicate with each other through a network 108. Computing system 110 can include one or more computing devices 112 (e.g., one or more servers), respectively, and one or more computer-readable storage devices 114 (e.g., one or more databases), respectively.

Each of computing devices 102-106 can represent various forms of processing devices. Example processing devices include a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or a combination of any these data processing devices or other data processing devices. Computing devices 102-106 and 112 may be provided access to or receive application software executed or stored on any of the other computing systems 102-106 and 112.

Computing device 112 may be any system or device having a processor, a memory, and communications capability for providing content to the electronic devices. In some example aspects, server 110 can be a single computing device, for example, a computer server. In other embodiments, server 110 can represent more than one computing device working together to perform the actions of a server computer (e.g., cloud computing). Further, computing device 112 can represent various forms of servers including, but not limited to a web server, an application server, a proxy server, a network server, or a server farm.

In some aspects, the computing devices may communicate wirelessly through a communication interface (not shown), which may include digital signal processing circuitry where necessary. The communication interface may provide for communications under various modes or protocols, for example, Global System for Mobile communication (GSM) voice calls, Short Message Service (SMS), Enhanced Messaging Service (EMS), or Multimedia Messaging Service (MMS) messaging, Code Division Multiple Access (CDMA), Time Division Multiple Access (TDMA), Personal Digital Cellular (PDC), Wideband Code Division Multiple Access (WCDMA), CDMA2000, or General Packet Radio System (GPRS), among others. For example, the communication may occur through a radio-frequency transceiver (not shown). In addition, short-range communication may occur, for example, using a Bluetooth, WiFi, or other such transceiver.

In some aspects, network environment 100 can be a distributed client/server system that spans one or more networks, for example, network 108. Network 108 can be a large computer network, for example, a local area network (LAN), wide area network (WAN), the Internet, a cellular network, or a combination thereof connecting any number of mobile clients, fixed clients, and servers. Further, the network 108 can include, but is not limited to, any one or more of the following network topologies, including a bus network, a star network, a ring network, a mesh network, a star-bus network, tree or hierarchical network, and the like. In some aspects, communication between each client (e.g., computing devices 102-106) and server (e.g., server 110) can occur via a virtual private network (VPN), Secure Shell (SSH) tunnel, or other secure network connection. In example aspects, communication between the client (e.g., computing device 102-106) and server can occur using protocols including, but not limited to, Hypertext Transfer Protocol (HTTP), Hypertext Transfer Protocol Secure (HTTPS) and SPDY protocols. In some aspects, network 108 may further include a corporate network (e.g., intranet) and one or more wireless access points.

In example aspects, any of computing devices 102-106 accesses a web page (e.g., hosted on server 110) to detect one or more elements (e.g., third-party elements) in the web page. The computing device (e.g., a web browser or other application on the computing device) also obtains one or more criteria for identifying web page elements which are invisible when displayed, and applies the one or more criteria to the one or more elements. The computing device determines, based on the applied criteria, that one of the one or more elements is invisible. In addition, the computing device provides a notification of the invisible element and/or blocks content (e.g., resources) associated with the invisible element.

Figure 2:
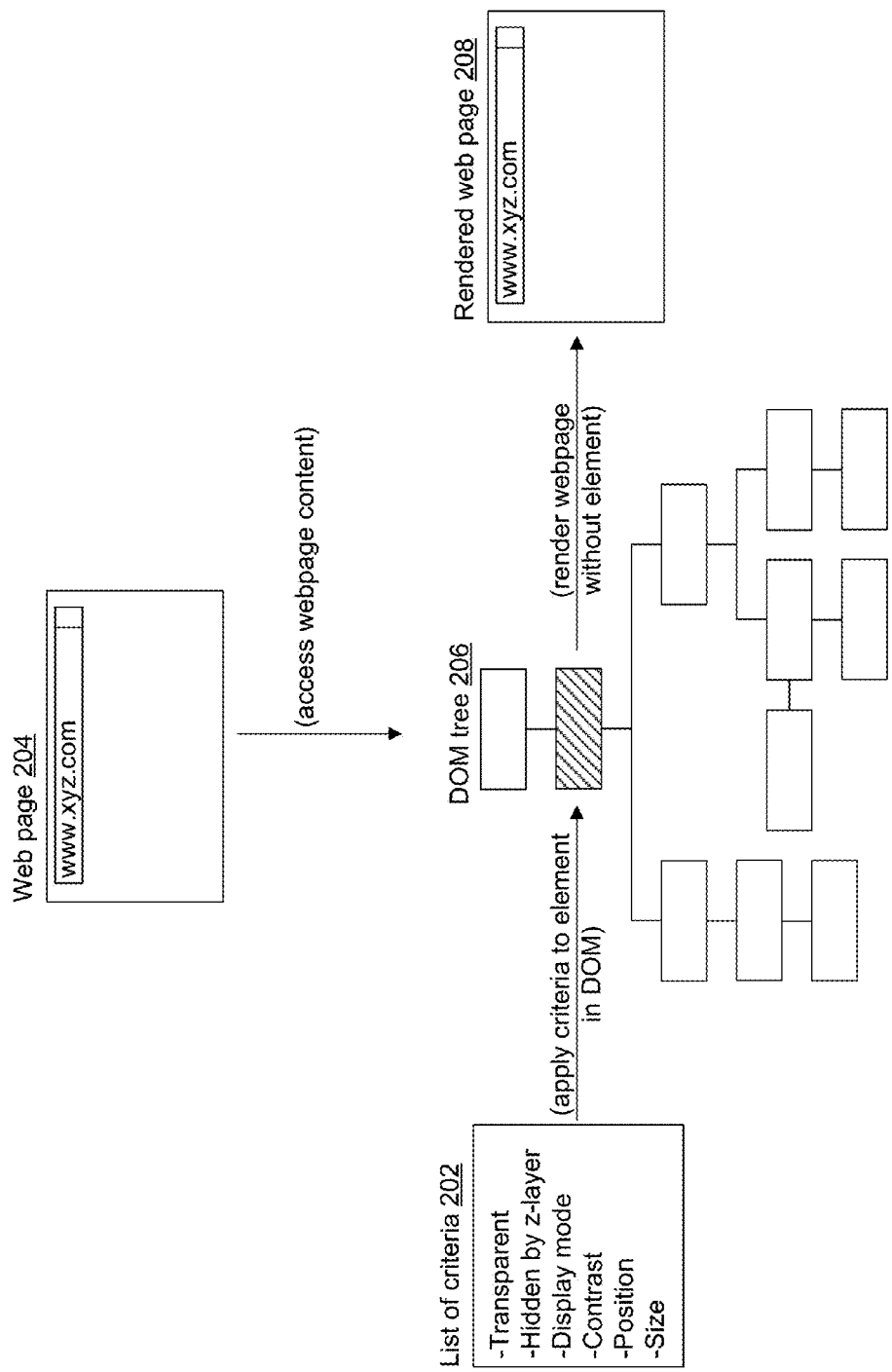
FIG. 2 illustrates an example of using a list of criteria to detect and process invisible elements within a web page.

FIG. 2 illustrates an example of using a list of criteria to process invisible elements within a web page. As can be seen in FIG. 2, a list of criteria 202 includes several criteria for determining whether a web page element appears invisible (or virtually invisible) within a web page. In example aspects, list of criteria 202 corresponds to a set of rules for determining whether or not web page elements appear invisible to a user viewing a web page.

For example, list of criteria 202 can define the following as invisible elements: transparent elements (e.g., as set by a cascading style sheet (CSS) attribute), elements hidden by a z-layer (e.g., elements at the bottom of an ordered stack of elements), elements being set to invisible based for a display mode (e.g., as set by a CSS attribute), elements with low contrast (e.g., red text on a red background), elements positioned beyond the viewable display area, or elements of small or no size (e.g., 0x0 pixels, elements of a single pixel, 0-width elements). Of course, it should be noted that list of criteria illustrated in FIG. 2 corresponds to examples of criteria for detecting invisible elements, and other criteria can be used.

The set of rules corresponding to list of criteria 202 is applied to different elements in the web page to determine if those elements are invisible. For example, list of criteria 202 can be applied to div elements, images, iframes, scripts and plugins, to determine if those elements are invisible. In addition, meta information associated with resources that are downloaded (e.g., images, scripts, plugins), such as cookies and caching information (e.g., an HTTP entity tag (ETag)) can be analyzed to determine if elements are invisible. Of course, it should be noted that these elements correspond to examples of web page elements to which criteria for detecting invisibility can be applied, and other elements can be used.

In addition, the set of rules corresponding to list of criteria 202 can be applied to different groups of web page elements. For example, the set of rules can be applied to every element of a web page. Alternatively, the set of rules can be applied only to third-party elements of a web page. By limiting application of the rules to third-party elements, it is possible to detect elements, from a third-party domain, which appear invisible. For example, given the website www.xyz.com, elements provided by the domain www.xyz.com correspond to primary (or first-party elements), while elements provided by other domains (www.abc.com, www.def.com) correspond to third-party elements.

Web page 204 can correspond to a web page, for example, hosted by server 110. Web page 204 can include first-party elements as well as third-party elements from third-party domains. The contents of web page 204 can be accessed, for example, by any one of computing devices 102-106. In the example of FIG. 2, the web page 204 is rendered within a browser (or other application) on the computing device. However, in example aspects, web page 204 is not rendered and the content of web page 204 can still be accessed by the computing device from a server (e.g., server 110).

A Document Object Model (DOM) tree 206 can be generated from the content accessed for web page 204. As used herein, "DOM" encompasses its plain and ordinary meaning, including but not limited to, an application programming interface (API) for valid HTML and well-formed XML documents. A DOM defines the logical structure of documents and the way a document is accessed and manipulated. In example aspects, a DOM corresponds to a tree representation of the elements (e.g., both primary and third-party elements) of a web page.

DOM tree 206 can be iterated over so that every element, or every third-party element, in DOM tree 206 is evaluated based on the criteria within list of criteria 202. The determination of whether to evaluate every element or every third-party element can be a default setting, or can correspond to a user-specified setting. In iterating over DOM tree 206, a determination is made as to whether an element is invisible, based on the criteria for detecting invisible elements in list of criteria 202. For example, an element (e.g., a div element, image, iframe, script, plugin) that meets one or more of the following criteria can be identified as invisible: transparent, hidden by the z-layer, display mode of invisible, contrast below a preset threshold, positioned outside of the viewable area, or below a threshold size.

In example aspects, for each element (or third-party element) identified to be invisible, further processing can be performed to confirm the invisibility of the detected element. In particular, the original web page (e.g., web page 204 as rendered within a browser) can be re-rendered (e.g., as web page 208) without the detected element. A comparison can be performed between the web page rendered with the element (e.g., web page 204) and the web page rendered without the element (e.g., web page 208). If the web pages as rendered are identical (or substantially identical), a determination can be made that the detected element is invisible. Otherwise, if the web pages are not identical, a determination can be made that the detected element is a visible element.

Figure 3:
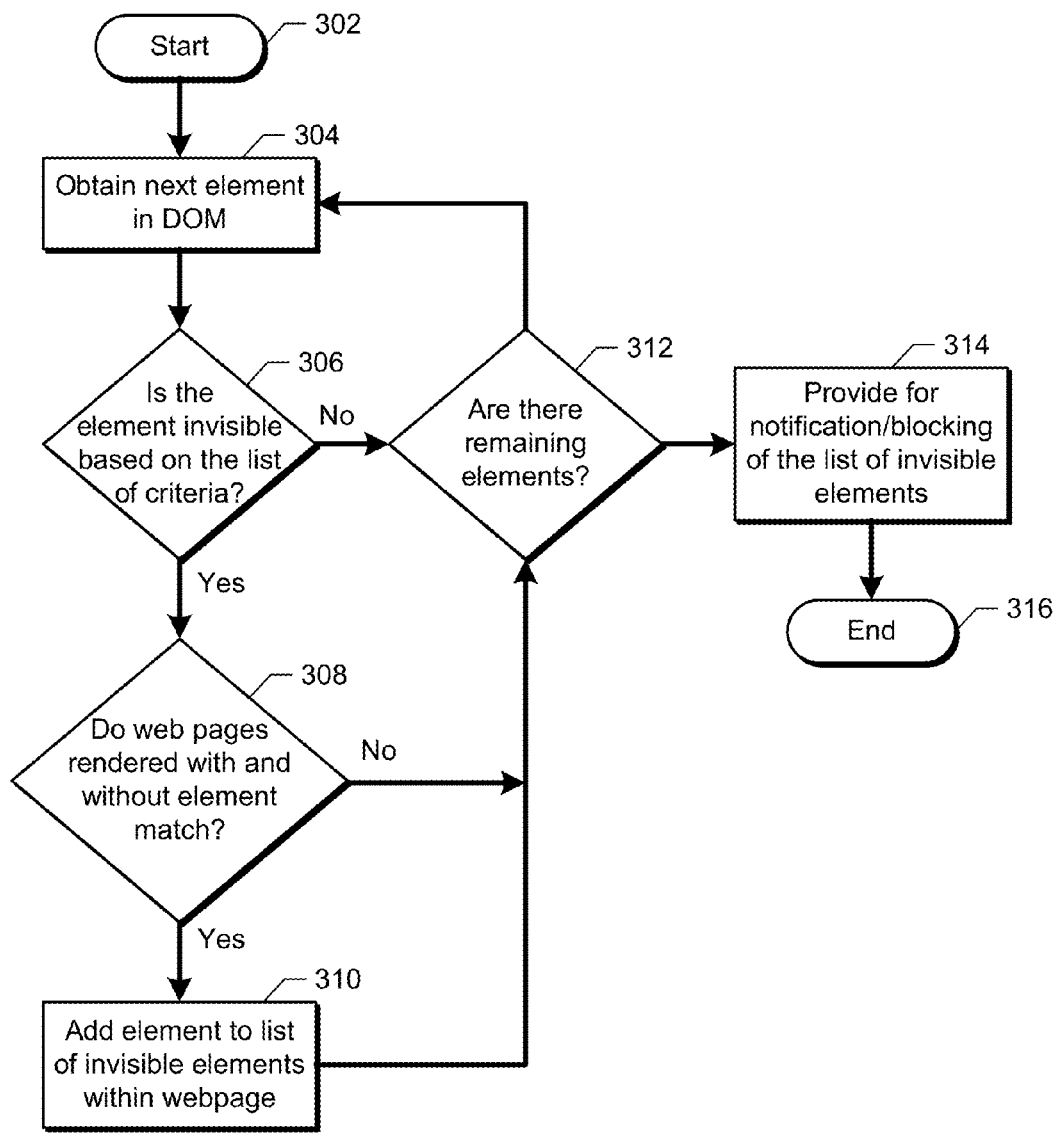
FIG. 3 illustrates an example process by which elements are detected and processed within a web page.

FIG. 3 illustrates an example process by which elements are detected and processed within a web page. The description of FIG. 3 will be provided with reference to the components of FIG. 2. However, it should be noted that FIG. 3 is not limited to such components.

Following start block 302, a first element is obtained in DOM tree 206 at step 304. In example aspects, the first element corresponds to the first of all elements (e.g., the root node) within DOM tree 206. In other example aspects, if only third-party elements are being considered (e.g., based on a setting specified by a user), the first element corresponds to the first third-party element in DOM tree 206.

At decision step 306, an inquiry is made as to whether the obtained element is invisible based on the criteria within list of criteria 202. As noted above, the element (e.g., div element, image, iframe, script, plugin) can be identified as invisible if it meets one or more of the following criteria: transparent, hidden by the z-layer, display mode of invisible, contrast below a preset threshold, positioned outside of the viewable area, or below a threshold size.

If the answer to this inquiry is no, the process continues to decision step 312 (described below). If the answer to this inquiry is yes, the process continues to decision step 308 (e.g., an optional step), at which an inquiry is made as to whether the web page rendered with the element (e.g., web page 204) matches the web page rendered without the element (e.g., web page 208). If the answer to this inquiry is no, the process continues to decision step 312 (described below). If the answer to this inquiry is yes, the element is added to a list of invisible elements within the web page.

At decision step 312, an inquiry is made as to whether there are any remaining elements (e.g., third-party elements) which have not yet been considered. If the answer to this inquiry is yes, the process returns to step 304, and one or more of steps 306-310 are repeated until all elements (e.g., third-party elements) have been considered.

If the answer to the inquiry at decision step 312 is no, then all elements have been considered, and the list of invisible elements is complete. The process then continues to step 314, which provides for notification and/or blocking of the elements within the list of invisible elements. Such notification and/or blocking will be described in greater detail with reference to FIG. 4.

Figure 4:
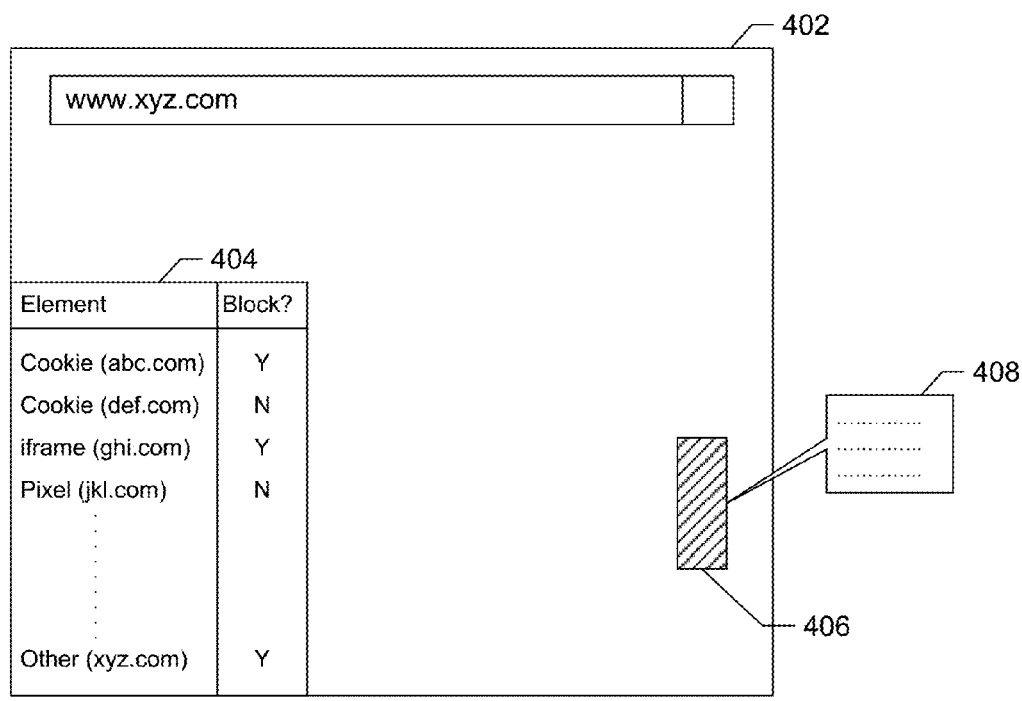
FIG. 4 illustrates an example web page interface which provides notification or blocking of an invisible element.

FIG. 4 illustrates an example web page interface which provides for notification or blocking of an invisible element. As noted above, multiple elements can be identified as invisible from a web page (e.g., from the DOM of a web page). A user can be notified of these invisible elements.

In the example of FIG. 4, web page 402, corresponding to www.xyz.com, is rendered within a browser. Element 406 corresponds to an element identified as invisible. Notification of the invisible element 406 can be provided by rendering element 406 so as to be visible (e.g., by highlighting or otherwise displaying element 406).

Alternatively, or in addition, a message 408 can be provided to notify or provide details of element 406. Such details include, but are not limited to, the source of element 406 (e.g., if element 406 is a third-party element, the domain name can be provided), and other properties of the element (e.g., the type of element, and the attribute by which the element was identified as invisible). In example aspects, message 408 can correspond to hover content, which is triggered by a hover event associated with the rendered version of element 406.

In example aspects, a table 404 can be displayed (e.g., along a side of web page 402) to list all elements identified within the above-mentioned list of invisible elements. For example, table 404 indicates a name/description for each element, which is obtained from the DOM tree. In addition, table 404 can include a column for blocking content associated with each of the invisible elements. For example, this column for blocking content can allow a user to specify whether content should be blocked from the domain (e.g., third-party domain) associated with the element. In example aspects, all content from third-party domains can be blocked (e.g., based on a user-specified setting).

A user can be provided with a list of domains that load third-party content (as well as last activity), a mapping of third-party content domains to primary domains (e.g., with controls for blocking particular domains or content), a control to block all third-party content, a control to block specific domains from third-party content, or a control to block HTML5 local storage or cookies from a third-party domain. In example aspects, the controls delete traces from the domains (e.g., cookies, local storage) in case the user blocks the domain. In further example aspects, the controls work on other websites that embed the same third-party domains that the user decided to block, so that future tracking can be prevented.

In addition to detecting and notifying a user of invisible elements, the subject technology can provide for detecting visible elements provided by third-party domains. In this regard, a separate list of visible elements which are served by third-party domains can be generated. The rendering of these third-party visible elements can be changed, so as to be different than primary elements which are visible (e.g., visible elements served by the first-party domain). Such differentiated display can allow a user to more easily notice third-party elements which are rendered in a web page.

Figure 5:
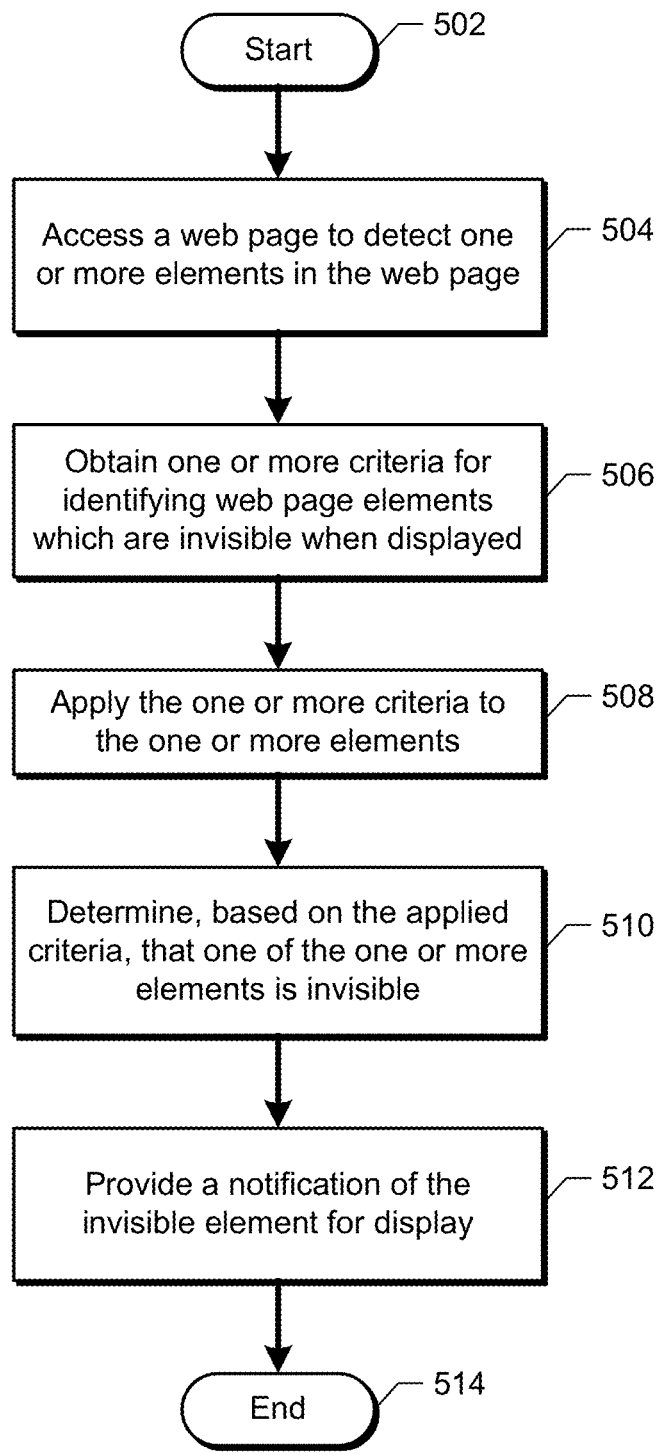
FIG. 5 illustrates another example process by which elements are detected and processed within a web page.

FIG. 5 illustrates another example process by which elements are detected and processed within a web page. Following start block 502, a web page is accessed to detect one or more elements (e.g., third-party elements) in the web page at step 504. Accessing the web page can include accessing a document object model (DOM) corresponding to a tree representation of the web page.

At step 506, one or more criteria for identifying web page elements, which are invisible when displayed, are obtained. The one or more criteria can identify web page elements having a setting of at least one of transparent, hidden, not visible, outside of web page view, below a threshold contrast, or below a threshold size, as invisible. At step 508, the one or more criteria are applied to the one or more elements.

At step 510, a determination is made that one of the one or more elements is invisible, based on the applied criteria. Determining that one of the one or more elements is invisible can further include, for each of the one or more elements, providing for a first rendering of the web page with the element, providing for a second rendering of the web page without the element, and determining whether the element is invisible based on a comparison between the first rendering of the web page and the second rendering of the web page.

At step 512, a notification of the invisible element is provided for display. Providing the notification of the invisible element for display can include rendering the invisible element to be visible. The notification of the invisible element can be provided for display as hover content.

Content associated with the invisible element can be blocked. Blocking the content associated with the invisible element can include preventing download of resources associated with the invisible element. Blocking the content associated with the invisible element can include providing a user control for blocking the content. Blocking the content associated with the invisible element can include blocking all third-party content. Alternatively, blocking the content associated with the invisible element can include blocking content from a third-party domain associated with the invisible element. Blocking the content associated with the invisible element can include blocking at least one of local storage or cookies associated with the invisible element.

The process then ends at end block 514.

Figure 6:
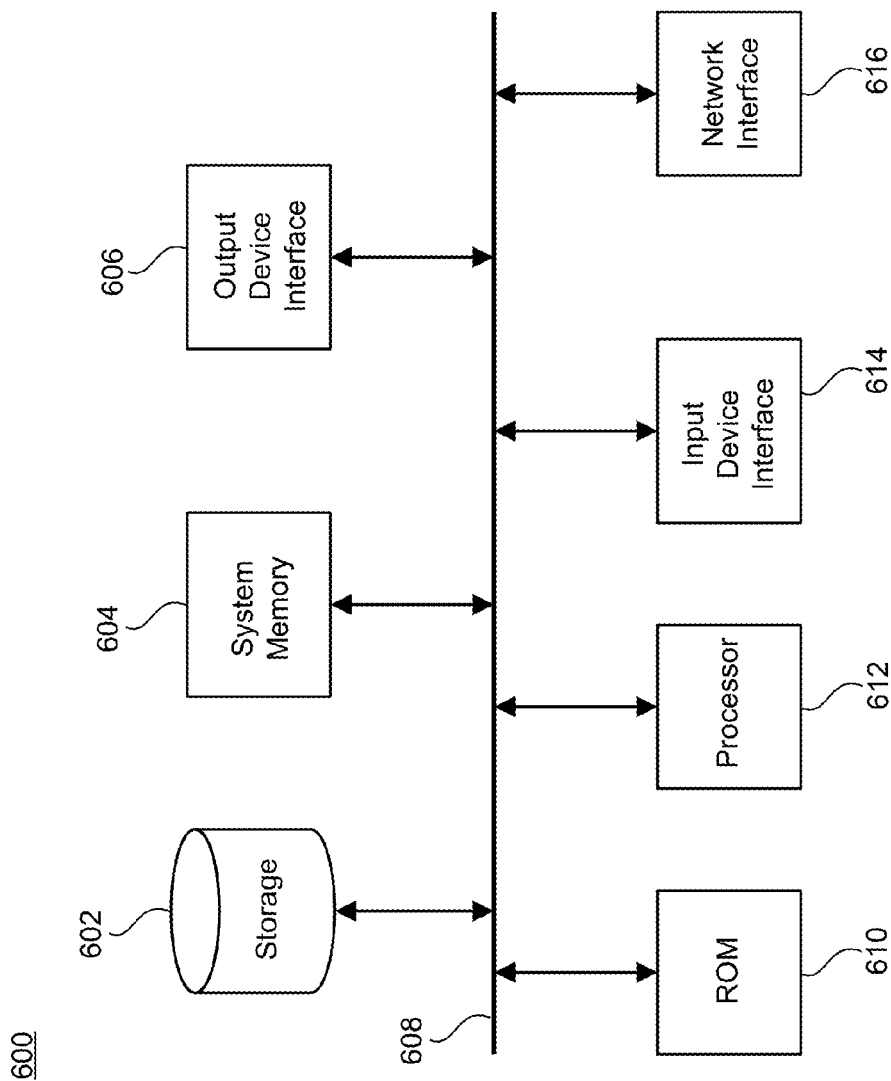
FIG. 6 conceptually illustrates an example electronic system with which some implementations of the subject technology can be implemented.

FIG. 6 conceptually illustrates an example electronic system with which some implementations of the subject technology can be implemented. Electronic system 600 can be a computer, phone, PDA, or any other sort of electronic device. Such an electronic system includes various types of computer readable media and interfaces for various other types of computer readable media. Electronic system 600 includes a bus 608, processing unit(s) 612, a system memory 604, a read-only memory (ROM) 610, a permanent storage device 602, an input device interface 614, an output device interface 606, and a network interface 616.

Bus 608 collectively represents all system, peripheral, and chipset buses that communicatively connect the numerous internal devices of electronic system 600. For instance, bus 608 communicatively connects processing unit(s) 612 with ROM 610, system memory 604, and permanent storage device 602.

From these various memory units, processing unit(s) 612 retrieves instructions to execute and data to process in order to execute the processes of the subject disclosure. The processing unit(s) can be a single processor or a multi-core processor in different implementations.

ROM 610 stores static data and instructions that are needed by processing unit(s) 612 and other modules of the electronic system. Permanent storage device 602, on the other hand, is a read-and-write memory device. This device is a non-volatile memory unit that stores instructions and data even when electronic system 600 is off. Some implementations of the subject disclosure use a mass-storage device (for example, a magnetic or optical disk and its corresponding disk drive) as permanent storage device 602.

Other implementations use a removable storage device (for example, a floppy disk, flash drive, and its corresponding disk drive) as permanent storage device 602. Like permanent storage device 602, system memory 604 is a read-and-write memory device. However, unlike storage device 602, system memory 604 is a volatile read-and-write memory, such a random access memory. System memory 604 stores some of the instructions and data that the processor needs at runtime. In some implementations, the processes of the subject disclosure are stored in system memory 604, permanent storage device 602, or ROM 610. For example, the various memory units include instructions for detecting and processing invisible elements within a web page in accordance with some implementations. From these various memory units, processing unit(s) 612 retrieves instructions to execute and data to process in order to execute the processes of some implementations.

Bus 608 also connects to input and output device interfaces 614 and 606. Input device interface 614 enables the user to communicate information and select commands to the electronic system. Input devices used with input device interface 614 include, for example, alphanumeric keyboards and pointing devices (also called "cursor control devices"). Output device interfaces 606 enables, for example, the display of images generated by the electronic system 600. Output devices used with output device interface 606 include, for example, printers and display devices, for example, cathode ray tubes (CRT) or liquid crystal displays (LCD). Some implementations include devices, for example, a touchscreen that functions as both input and output devices.

Finally, as shown in FIG. 6, bus 608 also couples electronic system 600 to a network (not shown) through a network interface 616. In this manner, the computer can be a part of a network of computers (for example, a local area network ("LAN"), a wide area network ("WAN"), or an Intranet, or a network of networks, for example, the Internet. Any or all components of electronic system 600 can be used in conjunction with the subject disclosure.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, for example, microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, for example, is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, for example, application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

What is claimed is:

1. A machine-implemented method of detecting and processing invisible elements within a web page, the method comprising:
   accessing a web page to detect web page elements in the web page;
   determining that one or more elements of the web page elements are associated with a domain different from that of the web page;
   obtaining one or more criteria for identifying web page elements which are invisible when displayed;
   applying the one or more criteria to the one or more elements;
   determining, based on the applied one or more criteria, that at least one of the one or more elements is invisible;
   for each of the at least one of the one or more elements determined to be invisible, determining a match in a comparison between rendering data for a first logical tree representation of the web page with the element and rendering data for a second logical tree representation of the web page without the element, for confirming that the element in the first logical tree representation is invisible when displayed; and
   providing for display a notification of at least one invisible element based on the determined match.

2. The method of claim 1, wherein the one or more elements correspond to one or more third-party elements.

3. The method of claim 1, wherein the one or more criteria identifies web page elements having a setting of at least one of transparent, hidden, not visible, outside of web page view, below a threshold contrast, or below a threshold size, as invisible.

4. The method of claim 1, wherein accessing the web page comprises accessing a document object model (DOM) corresponding to a tree representation of the web page.

5. The method of claim 1, wherein providing the notification of the invisible element for display comprises rendering the invisible element to be visible.

6. The method of claim 1, wherein the notification of the invisible element is provided for display as hover content.

7. The method of claim 1, further comprising blocking content associated with the invisible element.

8. The method of claim 7, wherein blocking the content associated with the invisible element comprises preventing download of resources associated with the invisible element.

9. The method of claim 7, wherein blocking the content associated with the invisible element comprises providing a user control for blocking the content.

10. The method of claim 7, wherein blocking the content associated with the invisible element comprises blocking all third-party content.

11. The method of claim 7, wherein blocking the content associated with the invisible element comprises blocking content from the domain associated with the invisible element.

12. The method of claim 7, wherein blocking the content associated with the invisible element comprises blocking at least one of local storage or cookies associated with the invisible element.

13. A system for detecting and processing invisible elements within a web page, the system comprising:
   one or more processors; and
   a machine-readable medium comprising instructions stored therein, which when executed by the processors, cause the processors to perform operations comprising:
      accessing a web page to detect web page elements in the web page;
      determining that one or more elements of the web page elements are associated with a domain different from that of the web page;
      obtaining one or more criteria for identifying web page elements which are invisible when displayed;
      applying the one or more criteria to the one or more elements;
      determining, based on the applied one or more criteria, that at least one of the one or more elements is invisible;
      for each of the at least one of the one or more elements determined to be invisible, determining a match in a comparison between rendering data for a first logical tree representation of the web page with the element and rendering data for a second logical tree representation of the web page without the element, for confirming that the element in the first logical tree representation is invisible when displayed; and
      blocking content associated with at least one invisible element based on the determined match.

14. The system of claim 13, wherein the one or more elements correspond to one or more third-party elements.

15. The system of claim 13, wherein accessing the web page comprises accessing a document object model (DOM) corresponding to a tree representation of the web page.

16. The system of claim 13, wherein the operations further comprise providing for display a notification of the at least one invisible element.

17. The system of claim 13, wherein the operations further comprise blocking resources associated with the invisible element.

18. A non-transitory machine-readable medium comprising instructions stored therein, which when executed by a system, cause the system to perform operations comprising:
   accessing a web page to detect web page elements in the web page;

determining that one or more elements of the web page elements are associated with a domain different from that of the web page;

obtaining one or more criteria for identifying web page elements which are invisible when displayed;

applying the one or more criteria to the one or more elements;

determining, based on the applied one or more criteria, that at least one of the one or more elements is invisible;

for each of the at least one of the one or more elements determined to be invisible, determining a match in a comparison between rendering data for a first logical tree representation of the web page with the element and rendering data for a second logical tree representation of the web page without the element, for confirming that the element in the first logical tree representation is invisible when displayed; and rendering at least one invisible element to be visible within the web page based on the determined match.

* * * * *